(12) United States Patent
Xu et al.

(10) Patent No.: US 7,265,525 B2
(45) Date of Patent: Sep. 4, 2007

(54) SELF-DRIVEN SCHEME FOR SYNCHRONOUS RECTIFIER HAVING NO BODY DIODE

(75) Inventors: Ming Xu, Blacksburg, VA (US); Julu Sun, Blacksburg, VA (US); Jinghai Zhou, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 273 days.

(21) Appl. No.: 11/094,438

(22) Filed: Mar. 31, 2005

(65) Prior Publication Data

US 2006/0226819 A1 Oct. 12, 2006

(51) Int. Cl.
*G05F 1/59* (2006.01)

(52) U.S. Cl. ............... 323/271; 323/282; 323/351; 363/127

(58) Field of Classification Search ........... 323/271, 323/282, 351; 363/17, 21.06, 21.4, 61, 127
See application file for complete search history.

(56) References Cited

U.S. PATENT DOCUMENTS

| | | | |
|---|---|---|---|
| 5,625,541 A * | 4/1997 | Rozman | 363/21.06 |
| RE36,571 E * | 2/2000 | Rozman | 363/21.06 |
| 6,064,580 A * | 5/2000 | Watanabe et al. | 363/17 |
| 6,249,156 B1 * | 6/2001 | Attwood | 327/110 |
| 6,477,065 B2 * | 11/2002 | Parks | 363/21.06 |
| 6,545,883 B2 * | 4/2003 | Xing et al. | 363/21.11 |
| 6,563,725 B2 * | 5/2003 | Carsten | 363/127 |
| 6,621,722 B1 * | 9/2003 | Yu | 363/127 |
| 6,650,552 B2 * | 11/2003 | Takagi et al. | 363/17 |
| 6,674,658 B2 * | 1/2004 | Mao et al. | 363/127 |
| 6,785,151 B2 * | 8/2004 | Ingman et al. | 363/91 |
| 6,894,468 B1 * | 5/2005 | Bretz et al. | 323/274 |
| 7,050,309 B2 * | 5/2006 | Farrington | 363/17 |
| 7,088,602 B2 * | 8/2006 | Priegnitz et al. | 363/127 |
| 7,126,387 B2 * | 10/2006 | Nair | 327/108 |
| 7,139,179 B2 * | 11/2006 | Hua | 363/89 |

* cited by examiner

*Primary Examiner*—Jeffrey Sterrett
(74) *Attorney, Agent, or Firm*—Whitham, Curtis, Christofferson & Cook, PC

(57) ABSTRACT

A voltage converter uses a component such as a JFET or four-terminal power MOSFET having no body diode and exhibiting no body diode conduction characteristic as a synchronous rectifier to reduce switching losses and body diode conduction losses and to support high frequency switching so that use of smaller components and higher current densities can be achieved. These effects are enhanced by a self-driven circuit utilizing positive feedback to enhance switching speed and reduce switching losses which increase with switching frequency.

18 Claims, 5 Drawing Sheets

SELF-DRIVEN SCHEME FOR SYNCHRONOUS RECTIFIER HAVING NO BODY DIODE

BACKGROUND OF THE INVENTION

1. Field of the Invention

The present invention generally relates to voltage regulator modules (VRMs) particularly for high-current, low-voltage applications such as the powering of microprocessors and, more particularly, to VRMs using switches which do not exhibit body diode effects and which may be self-driven.

2. Description of the Prior Art

The design of semiconductor integrated circuits and digital logic circuits, including memories, gate arrays and microprocessors in particular, has long exhibited a trend toward smaller circuit element size and increased density of circuit element integration on a chip in view of increased manufacturing efficiency and improved functionality and performance, particularly in terms of clock speed/cycle time and noise immunity, of the integrated circuit chips which can be realized thereby. However, small circuit element size and limitations on power dissipation requirements, particularly at higher clock speeds (e.g. above 1 GHz), and breakdown resistance has led to designs operating at lower voltages while the number of circuit elements integrated on a single chip has led to requirements for higher currents to power such chips. Currently, typical power supply voltages are about 1.3 volts and can be expected to decrease in future designs. It follows that the allowable difference between maximum and minimum input voltages has also greatly diminished with recent designs and may be expected to decrease further. As an example, the input voltage tolerance for a Pentium IV™ processor is only about 130 mV while corresponding current requirements currently exceed 70 A and can be expected to increase in future designs. It is projected that the next generation of microprocessors may have power requirements of in excess of 150 A at less than one volt. The current slew rate at the sensing point of the chip power supply connections may reach four to five Amperes/nsec as compared with 450 A/μsec currently required. The area which can be occupied by the power supply on the motherboard or elsewhere has become substantially fixed in designs for an extended period of time and it is also to be expected that future voltage converters/regulators and VRMs will be required to have a much increased current density compared with current circuits. The only solution to these projected requirements which is apparent at the present time is to increase switching frequency to allow smaller passive components such as capacitors and inductors to be used.

However, increased switching frequency increases switching related power losses and thus may cause problems in the thermal design of voltage regulators/converters. As switching frequency is increased, the body diode conduction loss of the so-called "bottom switch" (also referred to as a synchronous rectifier or, simply, SR) which supplies inductor current when the input switch (or "top switch", sometimes referred to as a control switch since its conductive period controls the voltage developed on an output filter capacitor by controlling charging from the higher input voltage) is off and gate driver losses become dominant. For example, in a buck converter having a 5V input and 1.3V/12 A output, the efficiency loss attributable to body diode loss of the synchronous rectifier at a switching frequency of 1 MHz is about 2.7% whereas at switching frequencies of 2 MHz and 3 MHz, the body diode conduction losses rise to about 5% and 7.2%, respectively. Turn-off loss and gate driver loss are comparable to body diode losses in their respective effects on efficiency. Further, given the trend toward portable digital data processing devices which are often operated on battery power, such additional losses are particularly undesirable.

The body diode and gate driver losses are compounded by the fact that the top switch and bottom switch are operated in a generally complementary fashion; the bottom switch being conductive when the top switch is not and vice-versa. To avoid shorting the input power supply, a short period of "dead-time" is generally provided between the conductive periods of the top and bottom switches. Further, a MOSFET is conventionally used as the bottom switch or synchronous rectifier in a buck converter and some other voltage converter circuit types. Therefore, the body diode conducts current during the dead-time and it is known that the voltage drop across a diode, such as the body diode of a MOSFET, is much larger than the voltage drop across the MOSFET in a conductive state and the diode body power loss is thus increased over normal MOSFET conduction loss. Moreover, the MOSFET should have a very low "on" resistance since it conducts current for the predominant portion of the switching period of the voltage converter, particularly when the difference between input and output voltages of the converter is large. It follows that the gate charge on the MOSFET may also be very large which causes a large gate driver loss at high switching frequencies.

SUMMARY OF THE INVENTION

It is therefore an object of the present invention to provide a voltage converter circuit using a device which does not exhibit body diode properties and/or which can be self-driven to substantially reduces or eliminate body diode and/or gate driver losses in order to allow switching at increased frequency in a voltage converter without significant increase in losses associated with higher frequency switching.

In order to accomplish these and other objects of the invention, a voltage converter is provided including a control switch in series with an input voltage terminal, and a synchronous rectifier capable of blocking current when the control switch is conductive and when a voltage applied to a gate of said synchronous rectifier is greater than a threshold voltage of said synchronous rectifier.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
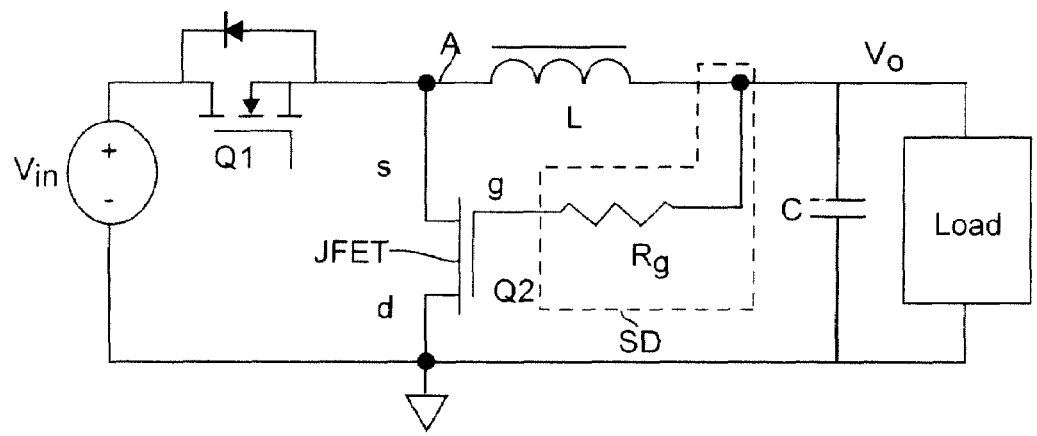
FIG. 1 is a simplified schematic diagram of a voltage converter circuit in accordance with the invention and including a JFET as the switching rectifier in a self-driven circuit.

Referring now to the drawings, and more particularly to FIG. 1, there is shown a simplified schematic diagram of a voltage converter in accordance with the invention. Although this simplified circuit cannot be directly realized at the present state of the art, as will be discussed in greater detail below, it will be useful in conveying an understanding of the invention sufficient to its successful practice by those skilled in the art.

It will be recognized by those skilled in the art that the basic circuit design of FIG. 1, generally follows that of a well-known buck converter; the operation of which is well understood. Basically, a buck converter employs an inductor L which is of sufficient inductance to function as a constant current source. An input voltage source $V_{in}$ supplies current to the inductor L through a top or control switch $Q_1$ to charge capacitor C from which the load is driven. While $Q_1$ is conductive, the inductor L develops a voltage which opposes the change in current from voltage source $V_{in}$ and thus reduces the voltage delivered to capacitor C and the load. When $Q_1$ is turned off, energy stored in inductor L will develop a voltage which tends to maintain (e.g. again, oppose change in) the current and the return current path is provided by switching bottom switch or synchronous rectifier $Q_2$ to an "on" state. In known buck converters, the output voltage (e.g. developed on capacitor C) is fed with a reference voltage to a comparator and a pulse width modulator PWM (illustrated in FIG. 5 but not in FIG. 1 in the interest of clarity) which normally controls the "on" state periods and timing of both $Q_1$ and $Q_2$ in a substantially complementary fashion to develop the desired voltage $V_0$ by regulating the period of connection to the input voltage source and the amount of current/charge transferred to capacitor C. However, a separate pulse width modulator is generally required to drive each of $Q_1$ and $Q_2$ and the comparator and the pulse width modulators each consume finite power and additional losses are also caused by the current drive for the respective gates of switches $Q_1$ and $Q_2$, as discussed above.

In contrast to the conventional buck converter and voltage converters of other types to which the invention is equally applicable, bottom switch or synchronous rectifier $Q_2$ is embodied by a low "on" resistance JFET (or other device which does not include a body diode or exhibit body diode characteristics such as a four-terminal power MOSFET) rather than a conventional MOSFET. Top or control switch $Q_1$ can be either a MOSFET or JFET, as may be desired or any other suitable low resistance switching device. The source of the JFET is connected to the control switch $Q_1$ and the drain of the JFET is connected to ground. The gate of the JFET is connected to the converter output through resistor $R_g$ and thus the JFET connection can be regarded as a self-driven circuit SD.

A typical JFET or four-terminal power MOSFET has no body diode and thus substitution of a JFET for a MOSFET avoids the body diode losses which increase with switching frequency, as alluded to above. The provision for the JFET to be self-driven also avoids the losses associated with separate control of the synchronous rectifier although pulse width modulated drive of $Q_1$ based on output voltage remains necessary to control the output voltage. Also, from FIG. 1, it is seen that the gate drive of $Q_2$ is from the output voltage which is very low and typically about one volt while the "on" resistance of a JFET is typically controlled by the gate current, typically about 10 mA. Therefore gate driver losses and losses in $R_g$, in accordance with the invention are extremely small.

Figure 2:
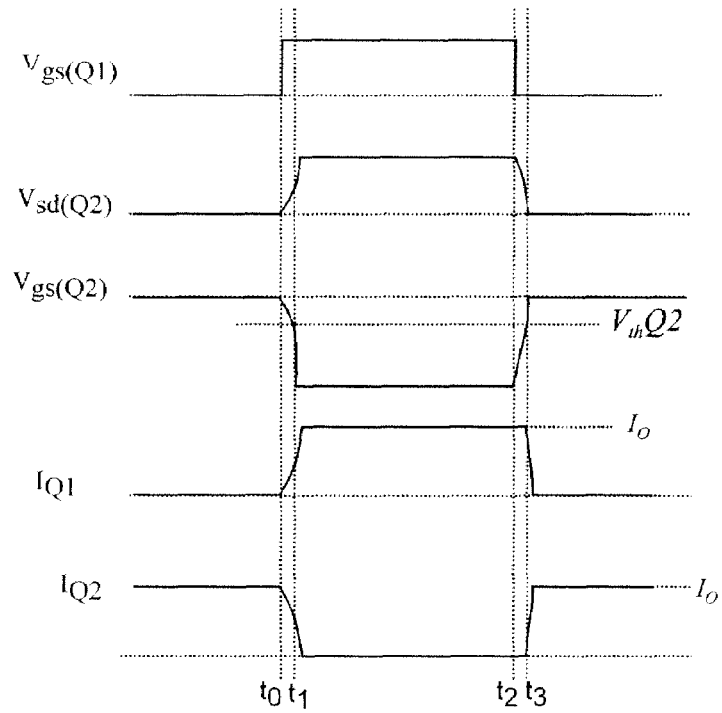
FIG. 2 illustrates the key waveforms of the voltage converter circuit of FIG. 1.

The key waveforms of the circuit of FIG. 1 are shown in FIG. 2. In the following discussion, it is assumed that inductance L has a sufficiently large value to effectively function and be treated as a constant current source $I_0$.

Figure 3:
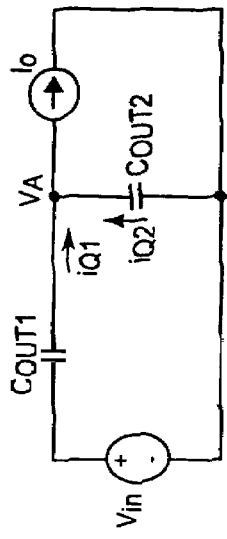
FIG. 3 is an equivalent circuit of the circuit of FIG. 1 during the time $t_0$-$t_1$ as indicated in FIG. 2.

Prior to $t_0$, the JFET conducts the load current. At $t_0$, $Q_1$ turns on. Since $V_{gs(Q2)}$ is still larger than its threshold voltage, $V_{th(Q2)}$, $Q_2$ is also (e.g. remains) turned on. FIG. 3 illustrates the equivalent circuit of FIG. 1 at this time, where $i_{Q1}$ increases as $i_{Q2}$ decreases since $L_{p1}$ and $L_{p2}$ are the parasitic inductors of $Q_1$ and $Q_2$, respectively, and the input voltage applies to both parasitic inductors while inductor L functions as a constant current source. As a result, the voltage at point A (the node at the junction of $Q_1$ and $Q_2$) increases and $V_{gs(Q2)}$ correspondingly decreases. The voltage increase of point A and consequent decrease of $V_{gs(Q2)}$ cause an increase in the resistance of $Q_2$ and further increase of the voltage at point A in a positive feedback manner and when $V_{gs(Q2)}=V_{th(Q2)}$, Q2 turns off at time $t_1$. Note that this turn off of $Q_2$ occurs as the current $I_{Q2}$, flowing in the direction shown in FIG. 3, is brought to zero and before it reverses from application of $V_{in}$. Therefore, $V_{in}$ is never shorted even though $Q_1$ and $Q_2$ are simultaneously conductive for a brief period and no dead time (and corresponding body diode conduction) occurs or is needed. Further, the positive feedback developed at point A causes the switching of $Q_2$ to be sufficiently rapid to accommodate very high frequency switching of $Q_1$, well above 2 to 3 MHz as determined by the pulse width modulator PWM. (In fact, the principal limitation on switching frequency is the amount of turn-off loss in top switch $Q_1$ that is tolerable since turn-off losses increase with switching frequency as discussed above.)

Figure 4:
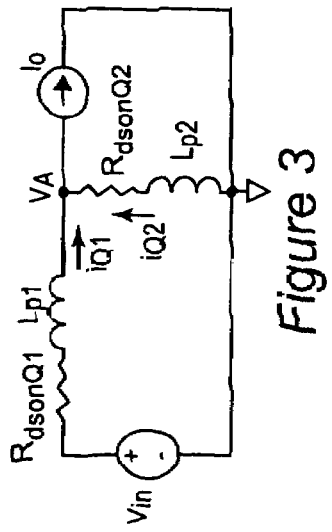
FIG. 4 is an equivalent circuit of the circuit of FIG. 1 during the time $t_2$-$t_3$ as indicated in FIG. 2.

After a period of time controlled by the pulse width modulation circuit to control voltage conversion, $Q_1$ is turned off at time $t_2$. The equivalent circuit of FIG. 1 at this time is shown in FIG. 4. The output current discharges the parasitic output capacitor $C_{out2}$ of $Q_2$ and charges the parasitic output capacitor $C_{out1}$ of $Q_1$ causing the voltage at point A to decrease and $V_{gs(Q2)}$ to increase. When $V_{gs(Q2)}$ again equals $V_{th(Q2)}$ of the JFET at time $t_3$, the JFET turns on and the change in voltage becomes positive feedback to complete the transition very quickly. Thus there is no dead time when $Q_1$ and $Q_2$ are both turned off since the turn-on of $Q_2$ is responsive to the turn-off of $Q_1$ and the increase $I_{Q2}$ is thus substantially complementary to the decrease of $I_{Q1}$ subsequent to time $t_3$ as shown in FIG. 2. Since there is no dead time, there is no need to add a diode in parallel with the JFET (or other switching device without a body diode) and no corresponding diode or body diode conduction loss occurs.

In view of the foregoing, it is seen that the invention can reduce or eliminate many sources of efficiency loss in a voltage converter, particularly those which tend to increase significantly with switching frequency, by the simple expedient of providing a switching rectifier with a device which does not include a body diode and, as a perfecting feature of the invention, arranging for the switching rectifier to be self-driven. It should be appreciated in this regard that dead time is usually provided to avoid the possibility of shorting the input voltage source as the drive signals for the control switch and synchronous rectifier are pulse width modulated at a high frequency and, in a normal buck converter or other switched converter must not be simultaneously on. In contrast to the normal buck converter, use of a self-driven circuit to control the synchronous rectifier allows the parasitic electrical characteristics of the switches to be used to avoid shorting the input voltage source even when both switches are on simultaneously for a short period. Moreover, the positive feedback provided by the self-driven circuit in accordance with the invention serves to maximize switching speed to accommodate high frequency switching.

However, the electrical characteristics of the device chosen for the synchronous rectifier are very stringent. The "on" resistance of the switching rectifier should, of course, be very low. However, power rectifiers capable of carrying 25 A and having an $R_{dson}$ of only 4mOhms are commercially available. Somewhat more difficult to achieve is that the switching rectifier device should have the ability to block voltage from source to drain. This quality is difficult to obtain using a JFET since most JFETs have no ability to withstand a large reverse voltage of the gate-source PN junction. However, some JFET structures do provide such a quality and, in any event, an ordinary JFET can be used for relatively low input voltage applications such as the second or later stage of a multi-stage voltage converter/regulator where the input voltage can be held to, for example, 5V. The most difficult quality to achieve is that the switching rectifier should block current (which would be conducted by a body diode of a MOSFET in a conventional voltage converter/regulator circuit) when $V_{gd}$ is greater than its switching threshold. This quality is difficult to achieve in a JFET since the gate-drain circuit is always forward biased in the circuit of FIG. 1 and no power JFET having this quality is commercially available at the present time. However, some other circuit expedients can be used to achieve this quality to a sufficient degree for the invention to be practiced successfully and economically as will now be discussed in connection with FIG. 5.

Figure 5:
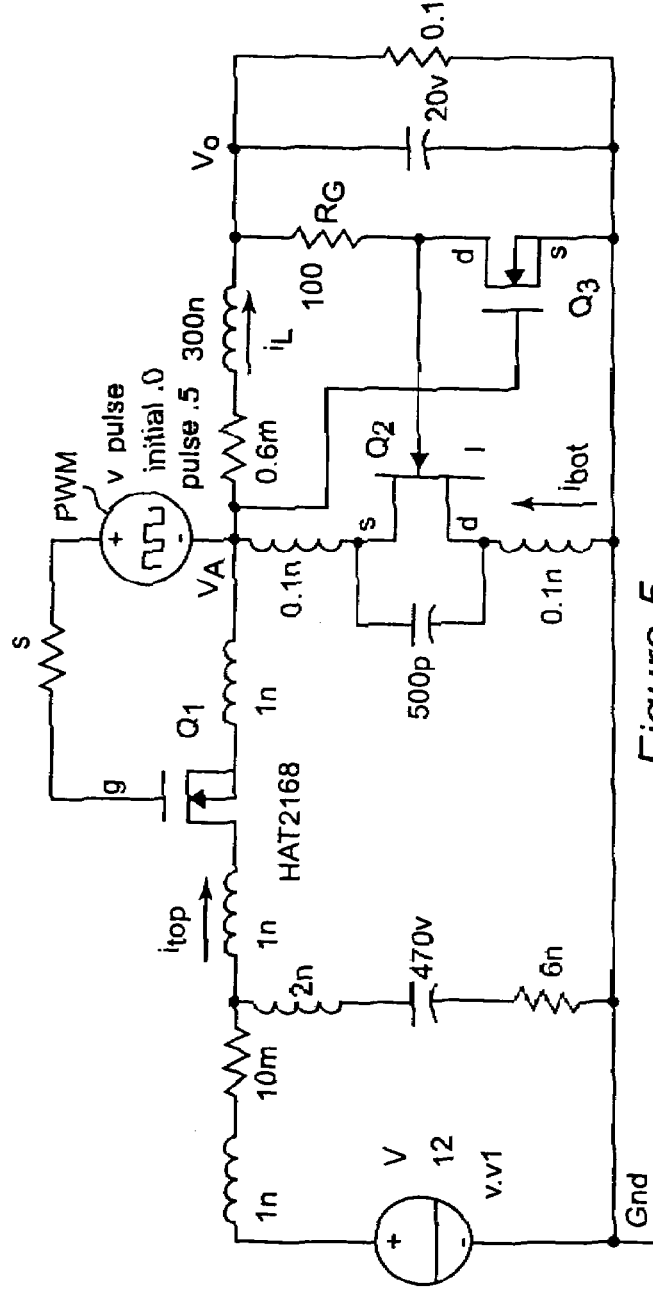
FIG. 5 is a preferred embodiment of a practical circuit using a JFET as a switching rectifier and self-driven switching.
Figure 6:
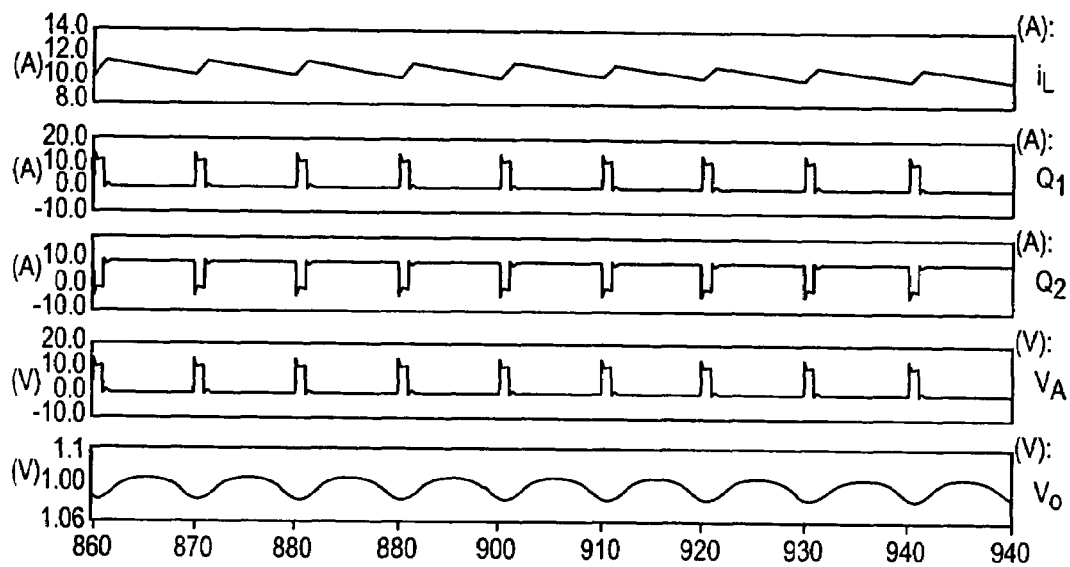
FIGS. 6 and 7 are key waveforms of the circuit of FIG. 5, as simulated.
Figure 7:
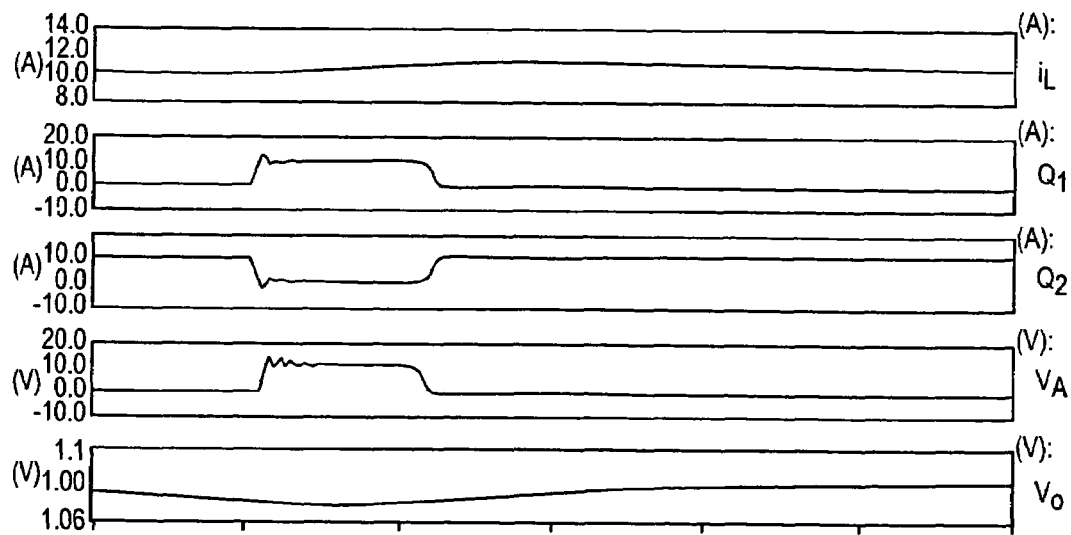
Figure 8:
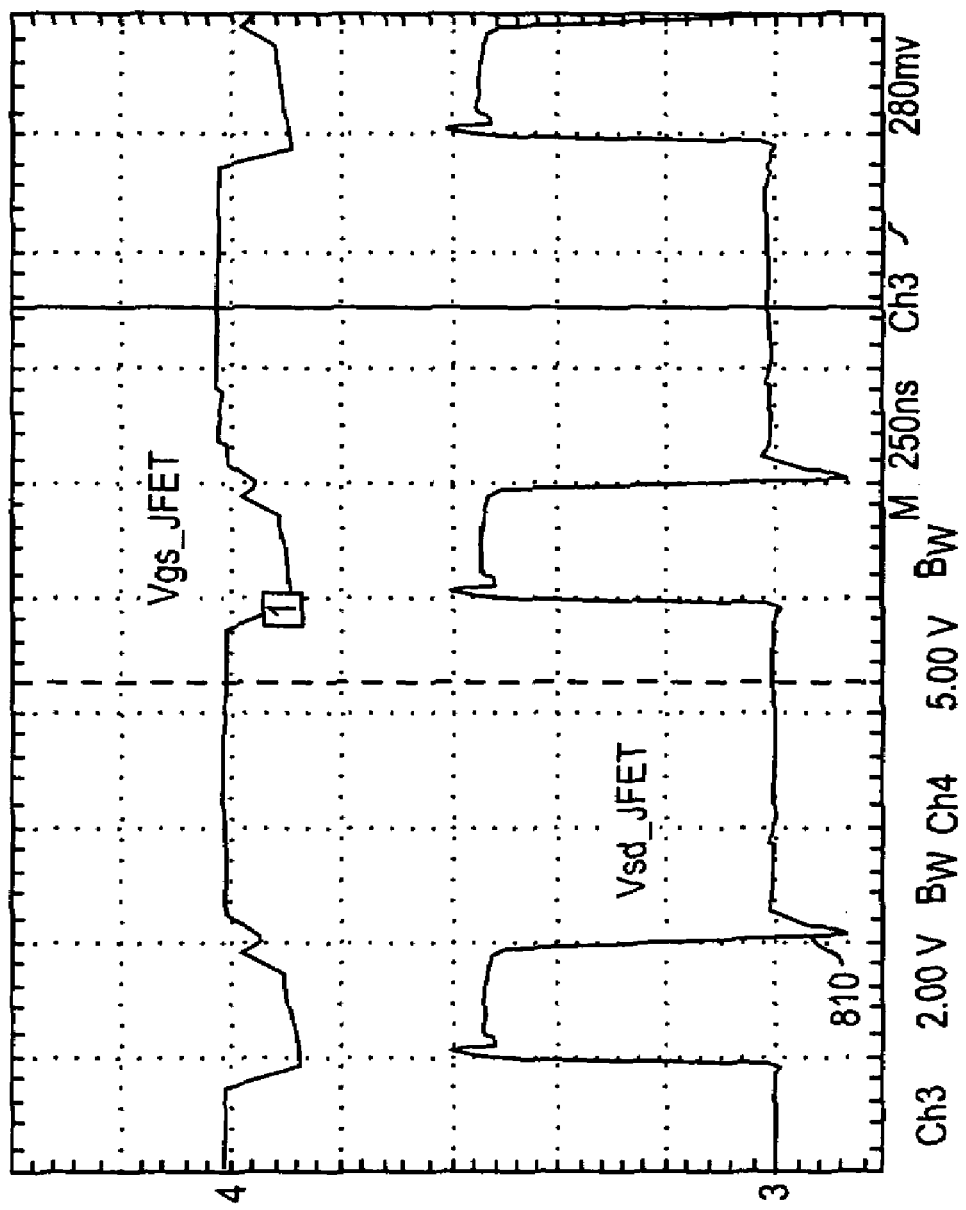
FIG. 8 illustrates a preliminary experimental result of the circuit of FIG. 5.

FIG. 5 schematically illustrates a presently preferred embodiment of the invention for a switching frequency of 1 MHz, an input voltage of 12V and an output voltage of 1V. It should be noted that all parasitic elements as discussed above are included to support a Saber simulation of the circuit; the results of which are shown in FIGS. 6 and 7 and confirmed by experimental results illustrated in FIG. 8. The circuit also includes a further small MOSFET $Q_3$ connected to the gate resistor $R_g$ of the synchronous rectifier $Q_2$ and functioning essentially as a pull down transistor to remove the gate-drain forward bias when $Q_2$ is turned off. $Q_3$ is preferably a normally off JFET with a threshold of 0.2 volts and its use provides substantially ideal qualities for a JFET used as $Q_2$.

FIG. 7 provides and enlarged illustration of the key waveforms of the simulated circuit of FIG. 5 and confirms that the circuit operates very well. The voltage waveform $V_A$ at point A confirms that there is no body diode conduction loss and the waveforms of $i_{Q1}$ and $i_{Q2}$ confirm that no shorting of $V_{in}$ occurs. The experimental results illustrated in FIG. 8 confirm the simulation results. However, since a normally-off power JFET is not available, a negative voltage is added to $V_{gdQ2}$ when the JFET is on. As a result, the JFET turns on more slowly, causing a negative voltage spike artifact 810 in the $V_{sdQ2}$ waveform. Nevertheless, FIG. 8 confirms the operability of the invention since it confirms that the self-driven JFET can turn on and turn off normally and in the manner expected to thus support operation at increased switching frequencies while reducing sources of efficiency loss which tend to increase with increased switching frequency.

Figure 9:
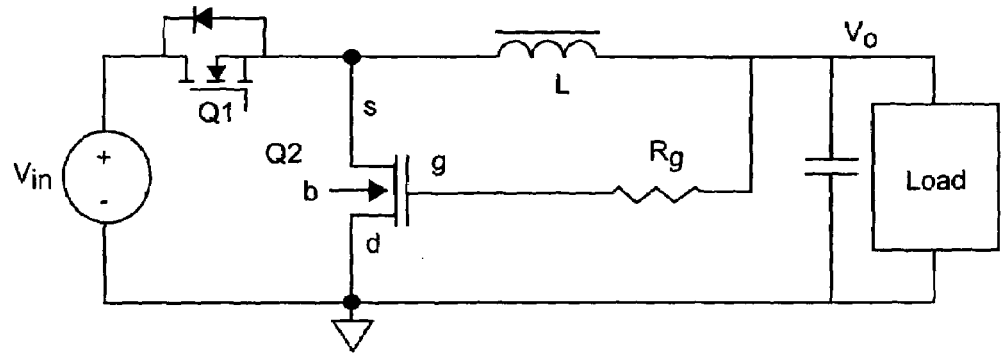
FIG. 9 is a schematic diagram of a variant form of the invention using a four-terminal power MOSFET.

Referring now to FIG. 9, an exemplary embodiment of the invention using an alternative component to the JFET synchronous rectifier is shown. It was alluded to above that a four-terminal power MOSFET which also does not have a body diode or exhibit body diode characteristics could be used for the synchronous rectifier rather than a JFET and such a component is illustrated in FIG. 9. The four-terminal power MOSFET has separate source and body terminals and, since the source and body are separate, there is no body diode between source and drain.

It should be noted that the source and drain connection of the MOSFET of FIG. 9 are reversed from the source and drain connections required to avoid voltage source shorting due to body diode orientation in a conventional buck converter (e.g. so that the body diode will only be forward biased when $Q_1$ is turned off and return current to the current source inductor is being carried. That is, in a conventional buck converter using a three-terminal MOSFET for the synchronous rectifier, the orientation of the inherent body diode is critical to avoid shorting the input voltage source when the control switch is conductive and that required body diode orientation allows body diode conduction when the synchronous rectifier is off. It is for this reason that the self-driven circuit described above cannot be used alone to avoid body diode conduction in a conventional buck converter. Conversely, the orientation of the four terminal MOSFET of FIG. 9 is determined in order to avoid the existence of a body diode and allows the self-driven circuit to be employed. In other words, operability of a conventional buck converter and other converter topologies using a synchronous rectifier or bottom switch and operability of the self-driven circuit as described above are mutually exclusive where the synchronous rectifier or bottom switch exhibits a diode characteristic even though the self driven circuit prevents shorting of the voltage supply and switches at a point where there would be no body diode conduction.

The remainder of the circuit is identical to that of FIG. 1 and functions in precisely the same manner so no further discussion of the circuit is necessary. The principal advantages of the embodiment of FIG. 9 is that it should be capable of a lower "on" resistance than a comparable JFET and that the pull-down transistor $Q_3$ of FIG. 5 is not necessary. However, no suitable four-terminal MOSFET is commercially available at the present time although fabrication of a suitable four-terminal power MOSFET appears possible.

It should also be noted that in the above discussion, the voltage source $V_{in}$ is not at all critical to the practice of the invention and may be any regulated or non-regulated voltage power supply at any practical voltage that can be accommodated by the device chosen as the synchronous rectifier or any of many other input power supply arrangements. Further, the invention, in accordance with its basic principles is not limited to buck converters and is equally applicable to other types of voltage converter topologies. Some exemplary topologies and alternative input power sources are illustrated in FIG. 10.

Figure 10:
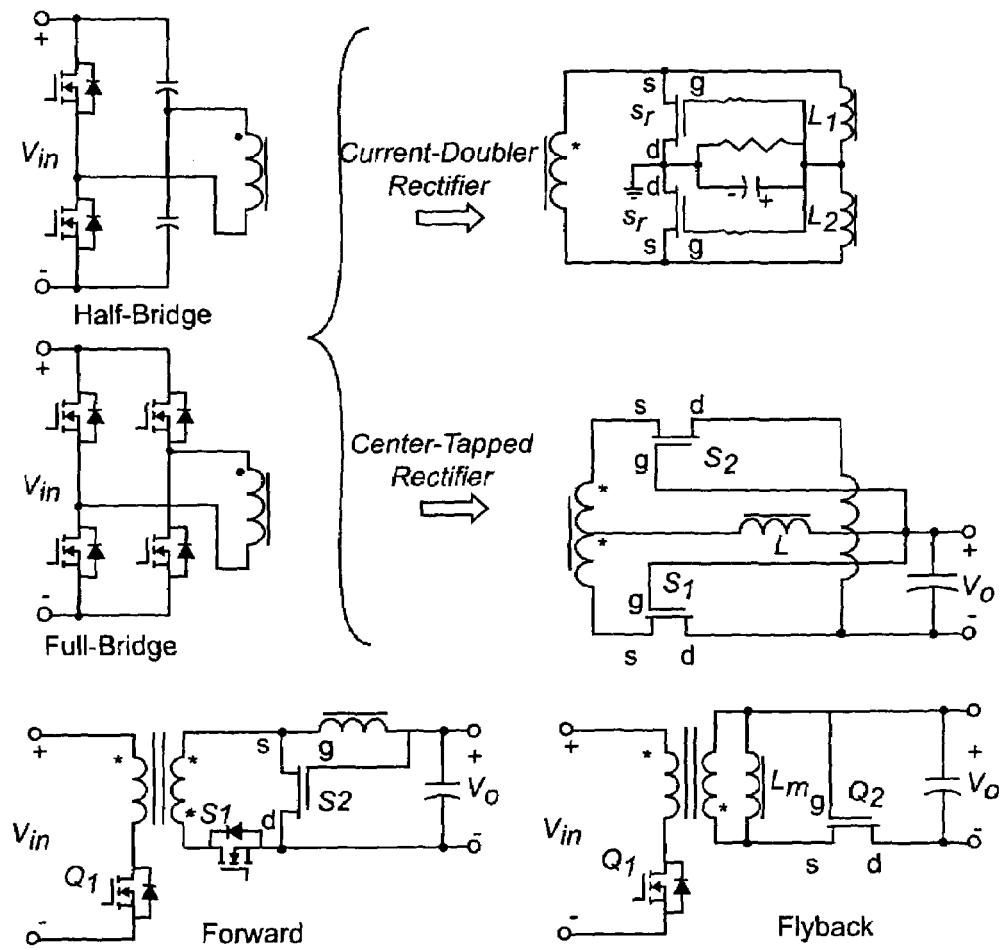
FIG. 10 illustrates application of the invention to transformer isolated circuits and other voltage converter topologies.

In FIG. 10 extension of the principles of the invention to transformer isolated topologies and other voltage converter topologies are shown, from which those skilled in the art will be enabled to apply the principles of the invention to many additional designs suitable for numerous applications. On the left side of the upper portion of FIG. 10 are shown both half-bridge and full bridge inputs providing inputs to a primary winding of a transformer; the half-bridge and full bridge switching circuits providing the function of control switch $Q_1$ and provide bi-directional current pulses in the transformer primary winding. The right side of the upper portion of FIG. 10, the transformer secondary winding is illustrated coupled to a current doubler rectifier converter and a center-tapped rectifier converter, respectively. It will be recognized by those skilled in the art that either the half-bridge or full bridge primary side can be used with either the current doubler rectifier converter or the center-tapped rectifier converted as indicated by the illustrated bracket. It will also be recognized by those skilled in the art that both the current doubler rectifier and the center-tapped rectifier converters comprise symmetrical branches or phases, each branch or phase being similar to that of FIGS. 1, 5 or 9 and allowing similar current to be provided by each branch or phase, operated in a cyclic sequence. Additional branches or phases can be added as may be desired using multiple transformers or a multi-phase transformer.

In the lower portion of FIG. 10, two additional transformer-isolated topologies are shown. Again, the control switch is shown on the primary winding side of the transformer which, like the half-bridge and full bridge circuits discussed above, provides current pulses allowing a transformer to be used for isolation. (Alternatively, a voltage source could be used with control switching connected as discussed above in connection with FIGS. 1, 5 or 9.) The circuit on the left includes a forward converter topology having additional switching $S_1$ but otherwise operating similarly to the buck converter described above. A very different flyback converter topology is illustrated on the right side of the lower portion of FIG. 10. Both of these circuits include a JFET, for which a four-terminal MOSFET or other component not having a body diode can be substituted, and a self-driven circuit operating substantially as described above.

In view of the foregoing it is seen that the invention provides for elimination or reduction of sources of efficiency loss including body diode conduction losses and gate drive losses while supporting operation at increased frequencies to allow reduction of size of passive circuit elements of a voltage converter circuit. The invention thus provides a voltage converter circuit using a device which does not exhibit body diode properties and/or which can be self-driven to substantially reduces or eliminate body diode and/or gate driver losses in order to allow switching at increased frequency in a voltage converter without significant increase in losses associated with higher frequency switching.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A voltage converter including
a control switch in series with an input voltage terminal, and
a synchronous rectifier means including a switch element having no body diode, said synchronous rectifier means being capable of blocking current from said input voltage terminal when said control switch is conductive and during turn-off of said switch element while a voltage applied to a gate of said switch element of said synchronous rectifier means remains greater than a switching threshold voltage of said switching element of said synchronous rectifier.

2. The voltage converter as recited in claim 1, further including
a self-driven circuit for controlling conduction of said synchronous rectifier.

3. The voltage converter as recited in claim 2 wherein said synchronous rectifier includes a JFET.

4. The voltage converter as recited in claim 3 wherein said self-driven circuit includes a pull-down transistor connected to said JFET.

5. The voltage converter as recited in claim 2 wherein said synchronous rectifier includes a four-terminal power MOSFET.

6. The voltage converter as recited in claim 1 wherein said synchronous rectifier includes a four-terminal power MOSFET.

7. The voltage converter as recited in claim 1 wherein said synchronous rectifier includes a JFET.

8. The voltage converter as recited in claim 1, further including a a voltage source connected to said voltage input terminal.

9. The voltage converter as recited in claim 1, further including an isolation transformer.

10. The voltage converter as recited in claim 9 wherein said control switch is included in a primary winding circuit of said transformer.

11. The voltage converter as recited in claim 10 wherein said control switch is included in a half-bridge circuit.

12. The voltage converter as recited in claim 10 wherein said control switch is included in a full bridge circuit.

13. The voltage converter as recited in claim 9 having a current doubler rectifier converter topology.

14. The voltage converter as recited in claim 1 having a buck converter topology.

15. The voltage converter as recited in claim 1 having a forward converter topology.

16. The voltage converter as recited in claim 1 having a flyback converter topology.

17. The voltage converter as recited in claim 1 further including
an inductor functioning as a constant current source.

18. The voltage converter as recited in claim 1 having a center-tapped rectifier converter topology.

* * * * *